E. LETORD.
CONTROL MECHANISM FOR MOTORS FOR AVIATION APPARATUS.
APPLICATION FILED NOV. 13, 1917.
1,310,757.
Patented July 22, 1919.
3 SHEETS—SHEET 3.
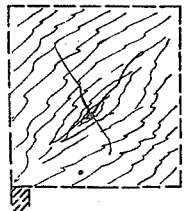
FIG. 2<sup>B</sup>
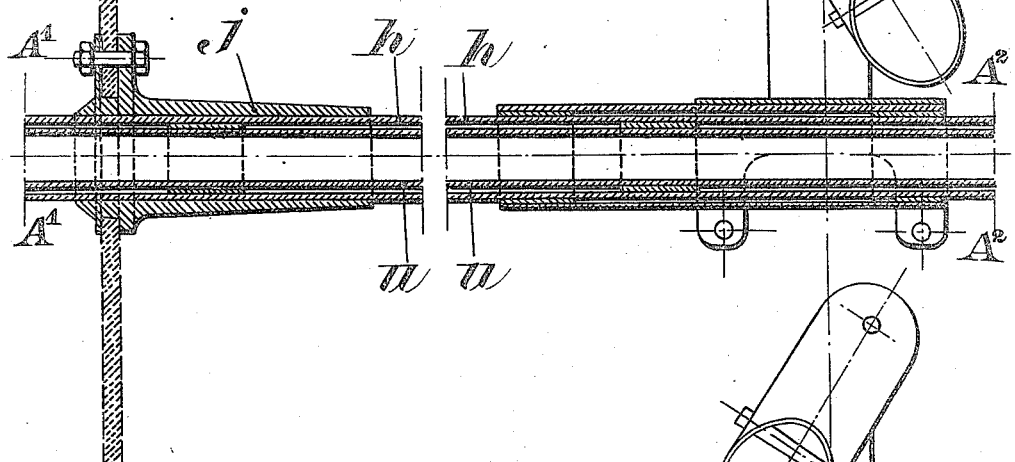
FIG. 2<sup>C</sup>
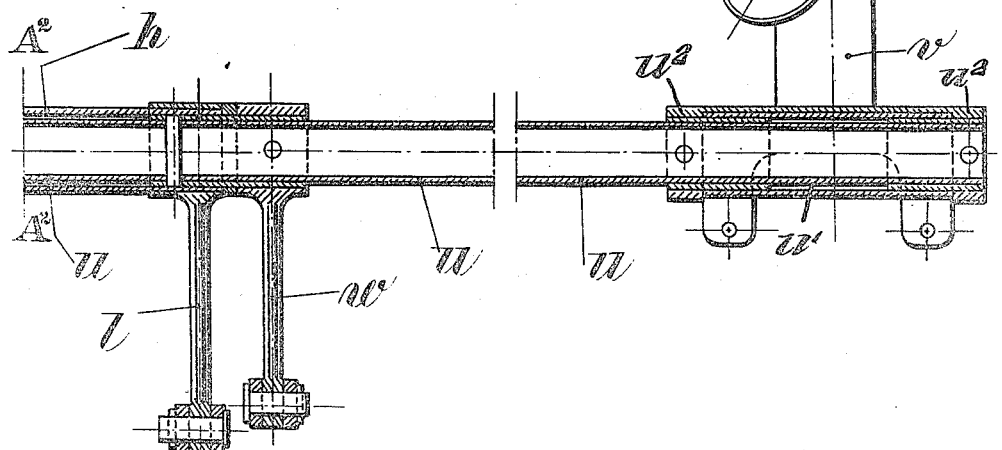

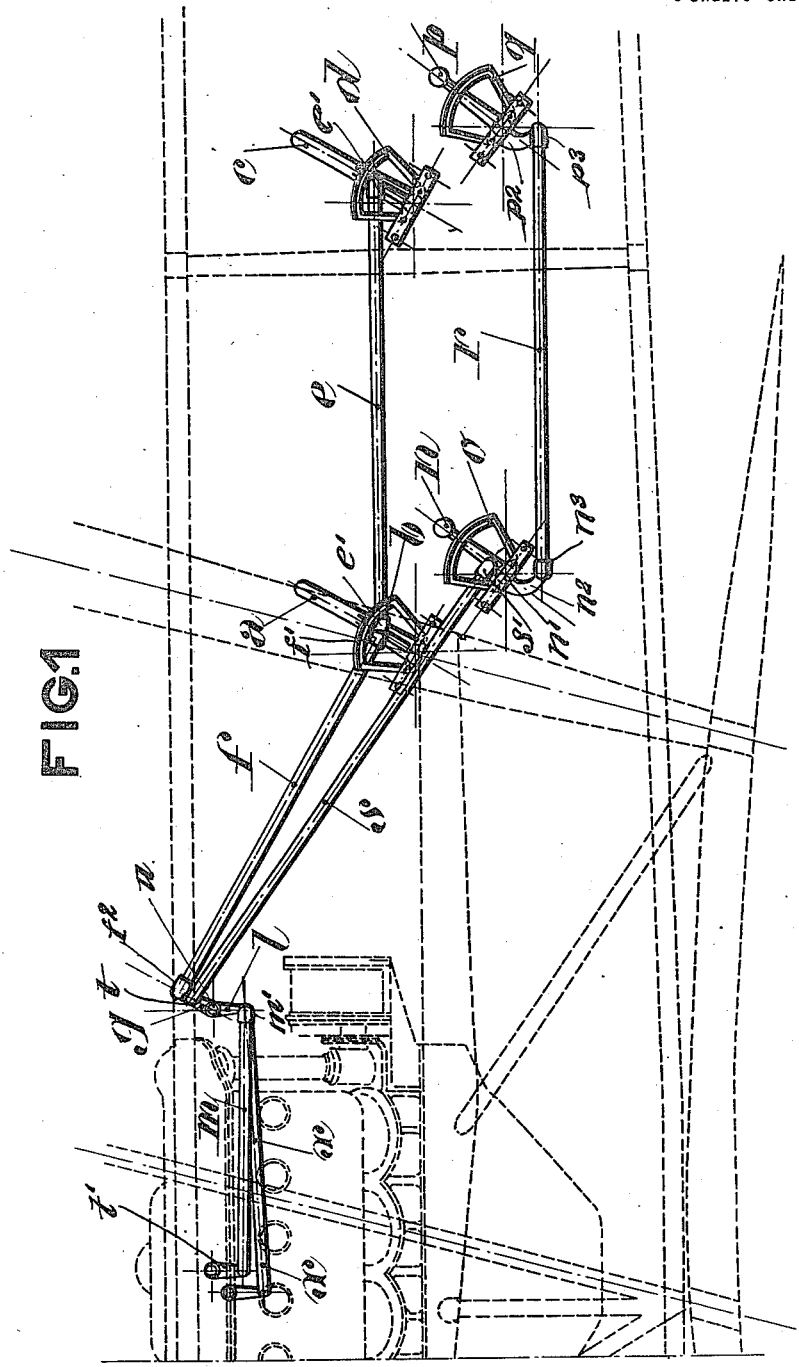

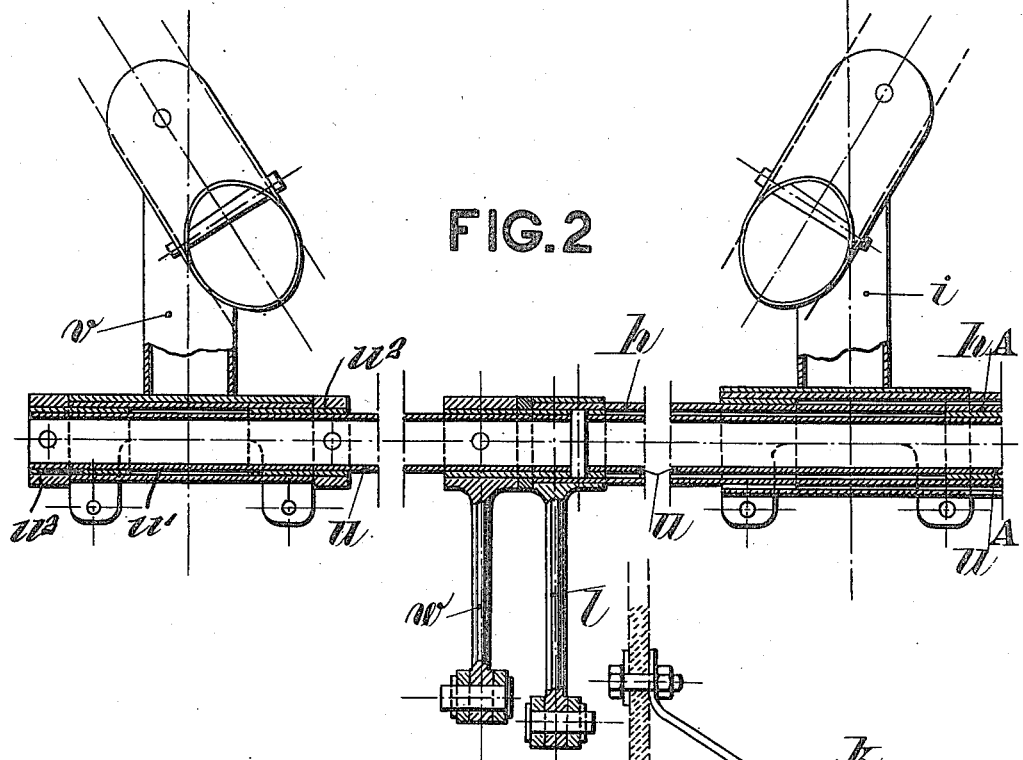
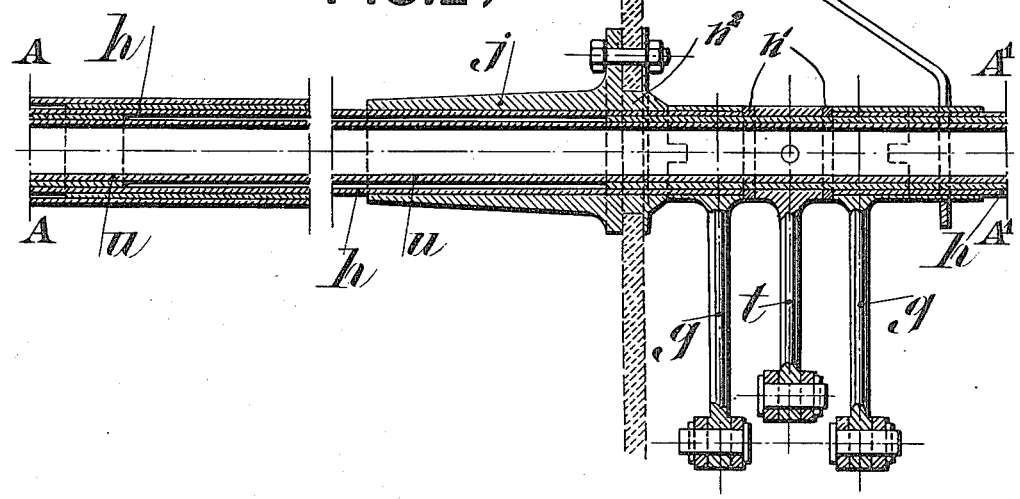

UNITED STATES PATENT OFFICE.

EMILE LETORD, OF MEUDON, FRANCE.

CONTROL MECHANISM FOR MOTORS FOR AVIATION APPARATUS.

1,310,757. Specification of Letters Patent. Patented July 22, 1919.

Application filed November 13, 1917. Serial No. 201,844.

*To all whom it may concern:*

Be it known that I, EMILE LETORD, a citizen of the French Republic, residing at Meudon, Seine-et-Oise, in France, have invented certain new and useful Control Mechanism for Motors for Aviation Apparatus, of which the following is a specification.

This invention relates to control mechanism for motors for aviation apparatus.

The mechanism is characterized by the use of rigid tubes and cranks for transmitting the movements from the handles operated by the pilots to the cranks for the gas control and for altimetric correction arranged on the motor.

The annexed drawings illustrate the invention.

Figure 1 is a general view,

Figs. 2, $2^A$, $2^B$ and $2^C$ represent in section and on an enlarged scale the shaft to which the operating levers are connected, Fig. $2^A$ being a continuation of Fig. 2 on the line A—A, Fig. $2^B$ a continuation of Fig. $2^A$ and Fig. $2^C$ a continuation of Fig. $2^B$ on the line $A^2$—$A^2$.

*1. For the control of the gases.*—This is effected by two handles $a$ (one for each motor) articulated on an axle fixed to the center of a sector $b$ fixed to the apparatus.

The two handles $c$ of the same shape as the handles $a$ are arranged in the same manner on a sector $d$ similar to the sector $b$ and similarly fixed to the apparatus.

At a certain distance from the point of oscillation of the handles are fixed two connecting-rods $e$ which thus render integral the handles $a$ and $c$ controlling the same motor; these connecting-rods $e$ are constituted by a tube at each end of which is fixed a capping-piece $e'$. The two capping-pieces $e'$ insure the fixity of the handles $c$ and directly embrace these handles. An axle passing through each of the capping-pieces and the corresponding handle insures the fixing of the connecting-rod to its handle, while allowing oscillatory movement of the rod around the axle.

The two capping-pieces securing the fixity of the handles $a$ are each connected to the capping-piece $e'$ of a connecting-rod $f$ by means of an axle, each capping-piece of one of the rods $f$ being fixed on the corresponding handle $a$ in the same manner.

The other end of the rod $f$ is also provided with a capping-piece $f'$. This capping-piece secures, by means of a pin, the fixing of the connecting-rod to the end of a crank $g$.

The two cranks $g$ are identical and are each rendered integral with a tube $h$ (Fig. $2^A$) in the following manner. Each tube $h$ has at one of its ends some notches. Small furring rings $h'$ of the same diameter as the tubes $h$ and having projections which exactly fit into the notches of the tubes are soldered in the bores of the cranks.

Each tube $h$ is supported by a bearing $i$ fixed to the apparatus and can besides rotate freely in a furring ring $h'$ gripped by the collar of a support $j$ fixed to the apparatus. One of the tubes $h$ is further supported by a bearing $k$.

At the other end of each of the tubes is fixed a crank $l$. A pin which passes through the crank $l$ and the capping-piece $m'$ of a connecting-rod $m$ renders them integral, while allowing an oscillatory movement.

Each connecting-rod $m$, renders the crank $l$ integral with the crank $t'$ of the gas control of the motor.

*2. For the control of altimetric correction.*—This is effected by means of a handle $n$ articulated on an axle $n'$ mounted at the center of a sector $o$ fixed to the apparatus.

A handle $p$ of the same form as the handle $n$ is arranged in the same manner on a sector $q$ similar to the sector $o$ also fixed to the apparatus.

The handles have each at their lower part a small finger $n^2$—$p^2$ respectively the ends of which are embraced by capping-pieces $n^3$—$p^3$ respectively through which passes an axle. Each of these capping-pieces is connected to a connecting-rod $r$ which makes the two handles integral.

On the handle $n$, at a certain distance from its pivot, is placed the capping-piece $s'$ of a connecting-rod $s$, also composed of a tube at each end of which is fixed a capping-piece. This connecting-rod is fixed at the end of a crank $t$ pinned on a shaft $u$ of smaller diameter than the tubes $h$ of the control of the gases. This tube $u$ passes through the two tubes $h$ and can rotate in these tubes. The tube $u$ can also rotate freely in two furring rings $u'$ Figs. 2 and $2^c$ gripped in the collars of two supports $v$ fixed to the apparatus. Two washers $u^2$ mounted on each side of each of the supports $v$ prevent axial displacement of the tube $u$.

On the tube $u$ opposite each motor are keyed two cranks $w$. The other end of each crank $w$ is connected to a connecting-rod $x$, an axle passing through the whole.

The other end of the connecting rod $x$ is connected to the crank for altimetric correction.

Each connecting-rod $x$ thus unites the crank $w$ with the corresponding altimetric correction crank fixed to the motor. It is to be noted that the cranks $g$ and $t$ may be located either above or below the shafts $h$ and $u$.

The working of this control mechanism is as follows:

*1. Control of the gases.*—Each motor having to be started separately, there is therefore a handle $a$ for each motor. The handle $a$ involves in its movement the corresponding handle $c$ with which it is invariably connected by means of the connecting-rod $e$, consequently the movements of the handles $a$ are transmitted to the handles $c$ and vice versa.

From the above it can be understood that it is immaterial whether the handles $a$ or the handles $c$ are employed, the movement of each handle being transmitted to the corresponding crank $g$ by the two connecting-rods $e$ each fixed on each handle $a$ and on each crank $g$.

Consequently each of the cranks $g$ involves in its movement a tube $h$; one of the tubes $h$ leads to the right-hand motor, the other to the left-hand motor, as shown in Figs. 2 and 3, which illustrate a longitudinal section made through the axis of the controlling tubes.

The rotary movement of each tube on its axis which is communicated to it by the corresponding crank $g$, is transmitted to the crank $l$ fixed on this tube. The end of each crank $l$ is therefore displaced around the axis of the tube when the handles $a$ or $c$ are operated.

Each crank $l$ is connected by means of a connecting-rod $m$ to the crank for gas control of its motor so that at each displacement of one of the controlling handles $a$ or $c$ there is a corresponding displacement of the gas crank fixed to the motor.

The radii of the various cranks are such that the angular displacements of the crank for the gas control correspond to the displacements of the corresponding handle $a$ and $c$ on its sector.

Finally, each connecting-rod $m$ has one of its capping-pieces screwed into the tube forming the body of the rod and a locking-nut allows the capping-piece to be fixed in a determined position with respect to the tube, so that the regulation of the control for a new running of the motor can be effected.

*2. Control of the altimetric correction.*— This control is secured by a single handle, the correction having to be made at the same time for both motors.

It is secured either by the handle $n$ or by the handle $p$, each of these handles being displaced on a sector having graduations corresponding to the various altitudes.

The angular displacements of the handle $n$ being invariably connected with those of the handle $p$ by means of the connecting-rod $r$, the position of the handle $n$ on the sector $o$ is therefore at any instant the same as that of the handle $p$ on the sector $q$.

At a suitable distance from the point of rotation of the handle $n$ is attached, by means of a pin on which it can revolve, the capping-piece fixed on the end of the tube forming the body of the connecting-rod $s$. The capping-piece $s'$ fixed at the other end of this tube is jointed on the axle on the end of a crank $t$.

The other end of this crank $t$ is drilled and into its bore passes a tube $u$ which also passes into the gas-control tubes $h$. A peg passing through the center of the crank $t$ and the tube $u$ renders them integral with each other, so that the tube $u$ rotates on its axis when the control handles are operated.

The tube involves in its rotary movement the two cranks $w$ which are pinned on it opposite the altimetric correction crank of each motor.

At the end of each of these cranks is jointed a connecting-rod $x$, the other end of which is jointed to the altimetric correction handle fixed to the motor. These connecting-rods $x$ are composed of a tube having a capping-piece fixed at one end, while in the other end, screw threaded internally, is screwed another capping-piece maintained in a given position by a locking-nut screwed on the tube.

In the control gear for the gases as in the altimetric control gear washers interposed between the cranks prevent the moving of one tube by the operation of the others.

In order to facilitate the dismounting and at the same time to allow of an easy adjustment of the tubes on each other, furring rings are fixed at intervals on the central tube, as illustrated in Figs. 2, $2^a$, $2^b$ and $2^c$. In the two controls springs press the handles against a plate of the corresponding graduated sectors, maintaining them in the position in which the pilot has placed them.

The improved controlling mechanism has the following advantages:

1. Of securing a perfect transmission of the movements, the least displacements of the handles, in no matter what direction being transmitted to the motors.

2. Of obviating any stiffness in the control.

3. Of allowing of dispensing with the return movement pulleys necessary when cables form part of the gear.

4. Of considerably reducing the resistance to the advance of the machine, the tube of altimetric correction control being arranged inside the others.

5. Finally, omission of various members, such as supports, the same ones serving for both controls.

What I claim as my invention and desire to secure by Letters Patent of the United States is:—

Control mechanism for motors for aviation apparatus comprising for the gas control a front handle and a rear handle for each motor, one within the reach of the pilot, a connecting rod uniting said handles, a tubular shaft, a crank thereon, a connecting-rod connecting said front handle to said crank, a second crank on said shaft, a connecting rod connecting said crank to the control lever of the motor gases, two handles for the control of the altimetric correction, one within the reach of the pilot, a connecting rod connecting said latter handles, a crank keyed on a tube, a connecting rod connecting one of said latter handles to said crank, said tube passing through the tubular member for controlling the gases, two cranks fixed on said tube, one opposite each motor and rods connecting said latter cranks to those of the altimetric correction cranks.

In witness whereof I have signed this specification in the presence of two witnesses.

EMILE LETORD.

Witnesses:
   Tesan Germsain,
   Marin Vachon.